(12) United States Patent
Koishikawa et al.

(10) Patent No.: US 9,956,945 B2
(45) Date of Patent: May 1, 2018

(54) RESERVOIR TANK MOUNTING STRUCTURE OF SADDLE RIDING VEHICLE

(71) Applicant: HONDA MOTOR CO., LTD., Tokyo (JP)

(72) Inventors: Takuma Koishikawa, Kumamoto (JP); Toru Sakai, Kumamoto (JP); Masayuki Hiramaru, Kumamoto (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/471,233

(22) Filed: Mar. 28, 2017

(65) Prior Publication Data
US 2017/0282885 A1    Oct. 5, 2017

(30) Foreign Application Priority Data

Mar. 31, 2016  (JP) .................................. 2016-073074

(51) Int. Cl.
*B60T 17/06* (2006.01)
*B62J 99/00* (2009.01)

(52) U.S. Cl.
CPC ............. *B60T 17/06* (2013.01); *B62J 99/00* (2013.01)

(58) Field of Classification Search
CPC combination set(s) only.
See application file for complete search history.

(56) References Cited

U.S. PATENT DOCUMENTS

| 2002/0005041 | A1* | 1/2002 | Shinohara | B60T 11/22 60/585 |
| 2005/0062343 | A1* | 3/2005 | Hayashi | B60T 17/06 303/1 |
| 2009/0058030 | A1* | 3/2009 | Fujita | B62K 19/38 280/124.128 |
| 2012/0204552 | A1* | 8/2012 | Takahashi | B60T 11/26 60/533 |
| 2015/0329166 | A1* | 11/2015 | Tsubone | B62L 3/00 180/229 |

(Continued)

FOREIGN PATENT DOCUMENTS

JP    58-75183 U    5/1983
JP    59-57294 U    4/1984

(Continued)

OTHER PUBLICATIONS

Japanese Notice of Allowance and English translation thereof, dated Aug. 15, 2017, for Japanese Application No. 2016-073074.

(Continued)

*Primary Examiner* — Kevin Hurley
(74) *Attorney, Agent, or Firm* — Birch, Stewart, Kolasch & Birch, LLP (57) ABSTRACT

A reservoir tank mounting section includes a reservoir tank configured to store a hydraulic fluid of a brake apparatus, and an auxiliary machine case. The auxiliary machine case has a tank supporting section configured to hold the reservoir tank. The tank supporting section is constituted by a recessed section in which an outer surface of the auxiliary machine case is recessed inward. The tank supporting section is formed substantially along an outer surface shape of the reservoir tank and has an outer surface covering wall configured to cover an outer surface of the reservoir tank.

6 Claims, 8 Drawing Sheets

(56) References Cited

U.S. PATENT DOCUMENTS

2015/0360670 A1* 12/2015 Lange .................... B60T 11/22
403/376

FOREIGN PATENT DOCUMENTS

| JP | 10-181650 A | 7/1998 |
| JP | 2005-119606 A | 5/2005 |
| JP | 2008-94161 A | 4/2008 |
| JP | 2010-23576 A | 2/2010 |
| JP | 2012-166756 A | 9/2012 |
| WO | WO 2015/029520 A1 | 3/2015 |

OTHER PUBLICATIONS

Extended European Search Report, dated Sep. 25, 2017, for European Application No. 17163252.4.

* cited by examiner

RESERVOIR TANK MOUNTING STRUCTURE OF SADDLE RIDING VEHICLE

CROSS-REFERENCE TO RELATED APPLICATION

Priority is claimed on Japanese Patent Application No. 2016-073074, filed Mar. 31, 2016, the content of which is incorporated herein by reference.

BACKGROUND

Field of the Invention

The present invention relates to a reservoir tank mounting structure of a saddle riding vehicle such as a motorcycle or the like.

Description of Related Art

In a saddle riding vehicle such as a motorcycle or the like, a reservoir tank configured to store a hydraulic fluid of a brake apparatus is mounted, and for example, a decrement of a hydraulic fluid in a master cylinder is replenished with the hydraulic fluid in the reservoir tank.

It is preferable that the reservoir tank does not bulge outward in a vehicle width direction when it is mounted on the vehicle, and disposition relations or the like of the other in-vehicle parts are devised variously (for example, Japanese Unexamined Patent Application, First Publication No. 2008-94161).

In a reservoir tank mounting structure disclosed in Japanese Unexamined Patent Application, First Publication No. 2008-94161, a reservoir is attached to a stepped section recessed inward in a vehicle width direction of a muffler protector at a rear side of a rising section of an exhaust pipe. The muffler protector includes a lower protector to which a reservoir tank is attached, and an upper protector disposed close to and above an upper surface (a lid member) of the reservoir tank.

The reservoir tank mounting structure can suppress an outward bulging amount of a reservoir tank in the vehicle width direction because the reservoir tank is disposed in the recessed section of the lower protector. Moreover, since the upper protector is disposed close to and above the upper surface of the reservoir tank, it is possible to prevent the lid member from being removed by mischief or the like.

SUMMARY

However, in the reservoir tank mounting structure disclosed in Japanese Unexamined Patent Application, First Publication No. 2008-94161, since the upper protector is formed along the exhaust pipe to be curved toward an upper rear side, a relatively large gap is provided between the upper surface of the reservoir tank and the upper protector. For this reason, deposits such as dust, mud, or the like, are likely to be collected on the upper surface of the reservoir tank upon use of the vehicle, and frequent maintenance is forced.

An aspect of the present invention is directed to provide a reservoir tank mounting structure of a saddle riding vehicle capable of preventing deposits from being collected on an outer surface of a reservoir tank while suppressing an increase in the number of parts.

A reservoir tank mounting structure of a saddle riding vehicle according to the present invention employs the following configuration in order to solve the above-mentioned problems.

(1) A reservoir tank mounting structure of a saddle riding vehicle according to an aspect of the present invention includes a reservoir tank configured to store a hydraulic fluid of a brake apparatus; and an auxiliary machine case configured to accommodate an auxiliary machine mounted on the vehicle, wherein the auxiliary machine case has a tank supporting section to which the reservoir tank is supported, the tank supporting section is formed at a recessed section that is formed by having an outer surface of the auxiliary machine case recessed inward, and the tank supporting section includes an outer surface covering wall that is configured to cover an outer surface of the reservoir tank with a shape substantially conforming to an outer surface shape of the reservoir tank.

According to the above-mentioned configuration, when the reservoir tank is supported by the tank supporting section of the auxiliary machine case, the outer surface covering wall of the tank supporting section substantially conforming to the outer surface shape of the reservoir tank covers the outer surface of the reservoir tank. Accordingly, a gap of the outer surface side of the reservoir tank is reduced using the auxiliary machine case, and deposits can be prevented from being collected on the outer surface of the reservoir tank.

(2) In the reservoir tank mounting structure of the saddle riding vehicle of the above-mentioned (1), the tank supporting section may be formed at the recessed section in which a side surface of the auxiliary machine case is recessed inward in a vehicle width direction, a residual quantity display part of a hydraulic fluid may be installed at an outer surface of the reservoir tank in the vehicle width direction, and the reservoir tank may be disposed in the recessed section in a state in which the residual quantity display part is exposed.

In this case, since the reservoir tank is disposed in the recessed section of the auxiliary machine case, an outward bulging amount in the vehicle width direction of the reservoir tank can be suppressed. In addition, in a state in which the reservoir tank is disposed in the recessed section of the auxiliary machine case, since the residual quantity display part is exposed to the outside, a maintenance worker can easily check a residual quantity of the hydraulic fluid through the residual quantity display part.

(3) The reservoir tank mounting structure of the saddle riding vehicle according to the above-mentioned (2) may further include a tank cover configured to cover at least an outer surface of the reservoir tank in the vehicle width direction, and the tank cover may have an opening for exposing the residual quantity display part of the reservoir tank to the outside.

In this case, since the outer surface of the reservoir tank in the vehicle width direction is covered by the tank cover, foreign substances such as scattered materials or the like upon traveling or the like of the vehicle can be prevented from contacting the reservoir tank. In addition, the residual quantity of the hydraulic fluid in the reservoir tank can be checked by the residual quantity display part through the opening of the tank cover. Accordingly, when this configuration is employed, the reservoir tank can be reliably protected without sacrificing maintenance performance.

(4) The reservoir tank mounting structure of the saddle riding vehicle according to any one of the above-mentioned (1) to (3) may further include a tank cover configured to cover an outer surface of the reservoir tank in a state in which the reservoir tank is accommodated in the recessed section, and the tank cover may be detachably attached to the auxiliary machine case by fastening members together with the reservoir tank.

In this case, since the reservoir tank and the tank cover are detachably attached to the auxiliary machine case by common fastening members, an increase in the number of parts can be suppressed while the performance of protecting the reservoir tank by the tank cover is improved.

(5) In the reservoir tank mounting structure of the saddle riding vehicle of the above-mentioned (4), a fastening section of the reservoir tank with respect to the auxiliary machine case may be provided at a position separated inward in the vehicle width direction with respect to a fastening section of the tank cover, and the fastening member may include a collar interposed between the fastening section of the tank cover and the fastening section of the reservoir tank, and a bolt that passes through the fastening section of the tank cover, the collar and the fastening section of the reservoir tank and that may be fastened to the auxiliary machine case.

In this case, the reservoir tank and the tank cover are fastened and fixed to the auxiliary machine case by the bolt in a state in which the collar is interposed between both of the fastening sections. In addition, upon maintenance of the reservoir tank such as replenishment of a hydraulic fluid or the like, after the bolt is released and the tank cover is removed once, the fastening section of the reservoir tank can be sandwiched between the head portion of the bolt and the collar, and in this state, the reservoir tank can be fastened and fixed to the auxiliary machine case together with the collar. When the reservoir tank is attached to the auxiliary machine case in this way, the reservoir tank is temporarily held in a state in which a portion of the reservoir tank protrudes toward a side of the auxiliary machine case. Accordingly, in this state, maintenance work with respect to the reservoir tank such as replenishment of a hydraulic fluid or the like can be performed.

(6) In the reservoir tank mounting structure of the saddle riding vehicle of the above-mentioned (5), in a state in which the fastening section is fixed to the auxiliary machine case while the tank cover is removed and the fastening section of the reservoir tank is sandwiched between a head portion of the bolt and the collar, the outer surface of the reservoir tank may be formed to overlap at least one of the outer surface covering wall and a circumferential wall of the recessed section in the vehicle width direction.

In this case, when the reservoir tank is temporarily supported while protruding toward the side of the auxiliary machine case, a portion of the outer surface of the reservoir tank can abut at least one of the outer surface covering wall and the circumferential wall of the auxiliary machine case. For this reason, positional deviation or large inclination of the reservoir tank in a temporary holding state can be restricted. Accordingly, when this configuration is employed, maintenance workability can be further improved.

(7) In the reservoir tank mounting structure of the saddle riding vehicle according to at least one of the above-mentioned (1) to (6), a portion of the auxiliary machine case may form a cross frame section configured to connect left and right side frame sections of a rear fender frame, and an outer surface of an air cleaner may be disposed to oppose the outside of the tank supporting section of the auxiliary machine case.

In this case, since the portion of the auxiliary machine case constitutes the cross frame section of the rear fender frame, stiffness of the rear fender frame can be increased without causing an increase in the number of parts of the vehicle body. In addition, since the outer surface of the air cleaner is disposed to oppose the outside of the tank supporting section, the reservoir tank can be protected using the outer surface of the air cleaner.

According to the aspect of the present invention, since the tank supporting section is installed at the auxiliary machine case and the outer surface covering wall is formed at the tank supporting section substantially conforming to the outer surface shape of the reservoir tank, a gap of the outer surface side of the reservoir tank can be decreased using the auxiliary machine case. Accordingly, according to the aspect of the present invention, deposits can be prevented from being collected on the outer surface of the reservoir tank while suppressing an increase in the number of parts. In addition, according to the aspect of the present invention, the outer surface of the reservoir tank can be protected using the auxiliary machine case.

DESCRIPTION OF EMBODIMENTS

Hereinafter, an embodiment of the present invention will be described based on the accompanying drawings. Further, directions of forward, rearward, left, right, and so on, described below are the same as directions of a vehicle described below unless the context clearly indicates otherwise.

In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

Figure 1:
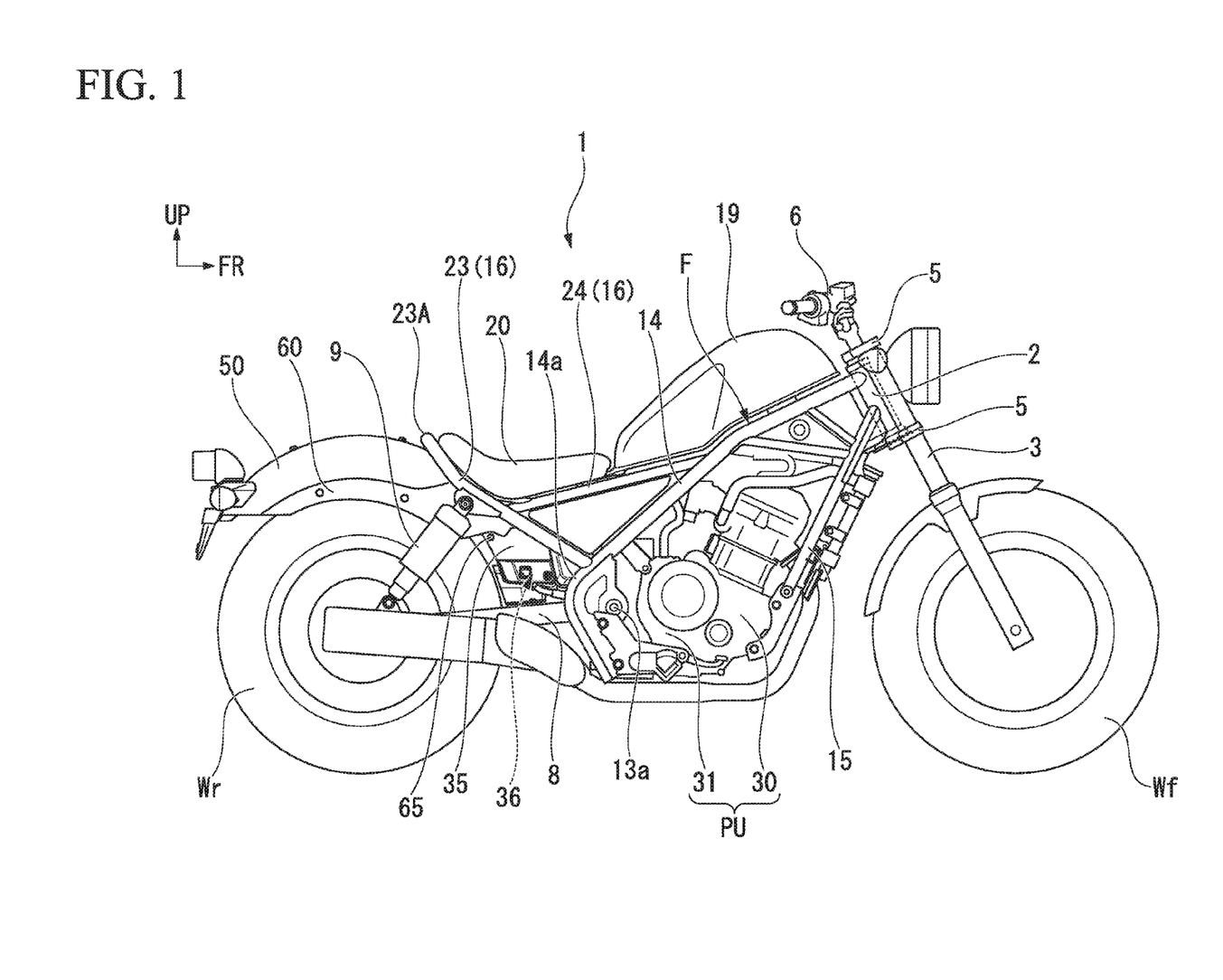
FIG. 1 is a side view of a saddle riding vehicle according to an embodiment of the present invention.

FIG. 1 is a view showing a right side surface of a saddle riding vehicle according to an embodiment. The saddle riding vehicle according to the embodiment is a so-called cruiser type motorcycle 1 in which a vehicle height is decreased and a forward/rearward length is increased. A front wheel Wf of the motorcycle 1 is rotatably supported by lower end portions of a pair of left and right front forks 3. The left and right front forks 3 are supported by a head pipe 2 of a front end portion of a vehicle body frame F via upper and lower bridge members 5 and a steering stem (not shown). A bar type steering handle 6 is attached to the upper bridge member 5.

A rear wheel Wr of the motorcycle 1 is supported by rear end portions of a swing arm 8. A front end portion of the swing arm 8 is vertically and swingably supported by a pivot section 13a of the vehicle body frame F. The rear wheel Wr is linked to a power unit PU of the motorcycle 1 via, for example, a transmission mechanism or the like constituted by a chain. Lower end portions of rear cushions 9 serving as a suspension part of the rear wheel Wr side are connected to the swing arm 8 in the vicinity of rear wheel support sections. Further, a reference numeral 19 of FIG. 1 designates a fuel tank, and a reference numeral 20 designates a seat on which a driver sits.

In addition, the vehicle body frame F includes a pair of left and right main frames 14 branched off from an upper rear side of the head pipe 2 toward left and right sides, extending rearward and downward when seen in a side view and then extending downward by changing a direction at rear curved sections 14a, a pair of left and right down frames 15 branched off from a lower rear side of the head pipe 2 toward left and right sides and extending rearward and downward to be steeply inclined more than the main frames 14 when seen in a side view, a rear frame 16 connected to rear upper surface sides of the left and right main frames 14, and a rear fender frame 60 having a front region connected to the rear frame 16 and configured to support a rear fender 50 that covers an upper part of the rear wheel Wr.

The power unit PU in which an engine 30 and a gear box 31 are integrated is disposed in a region surrounded by the down frames 15 and the main frames 14. The power unit PU is attached to the down frames 15 and the main frames 14 to constitute a portion of the vehicle body frame F.

The rear frame 16 has a pair of left and right seat frame sections 23 extending from upper surfaces close to the rear curved sections 14a of the left and right main frames 14 toward rear upper sides (extending toward a rear position of the seat 20), and a connecting section 23A curved in substantially a U shape and configured to connect rear sections of the left and right seat frame sections 23.

The rear frame 16 has a pair of left and right seat sub-frame sections 24 further extending from substantially intermediate positions in an extension direction of the left and right seat frame sections 23 toward front upper sides and having front end portions connected to the left and right main frames 14. The seat 20 is supported by upper sections of the seat frame sections 23 and the seat sub-frame sections 24.

Figure 2:
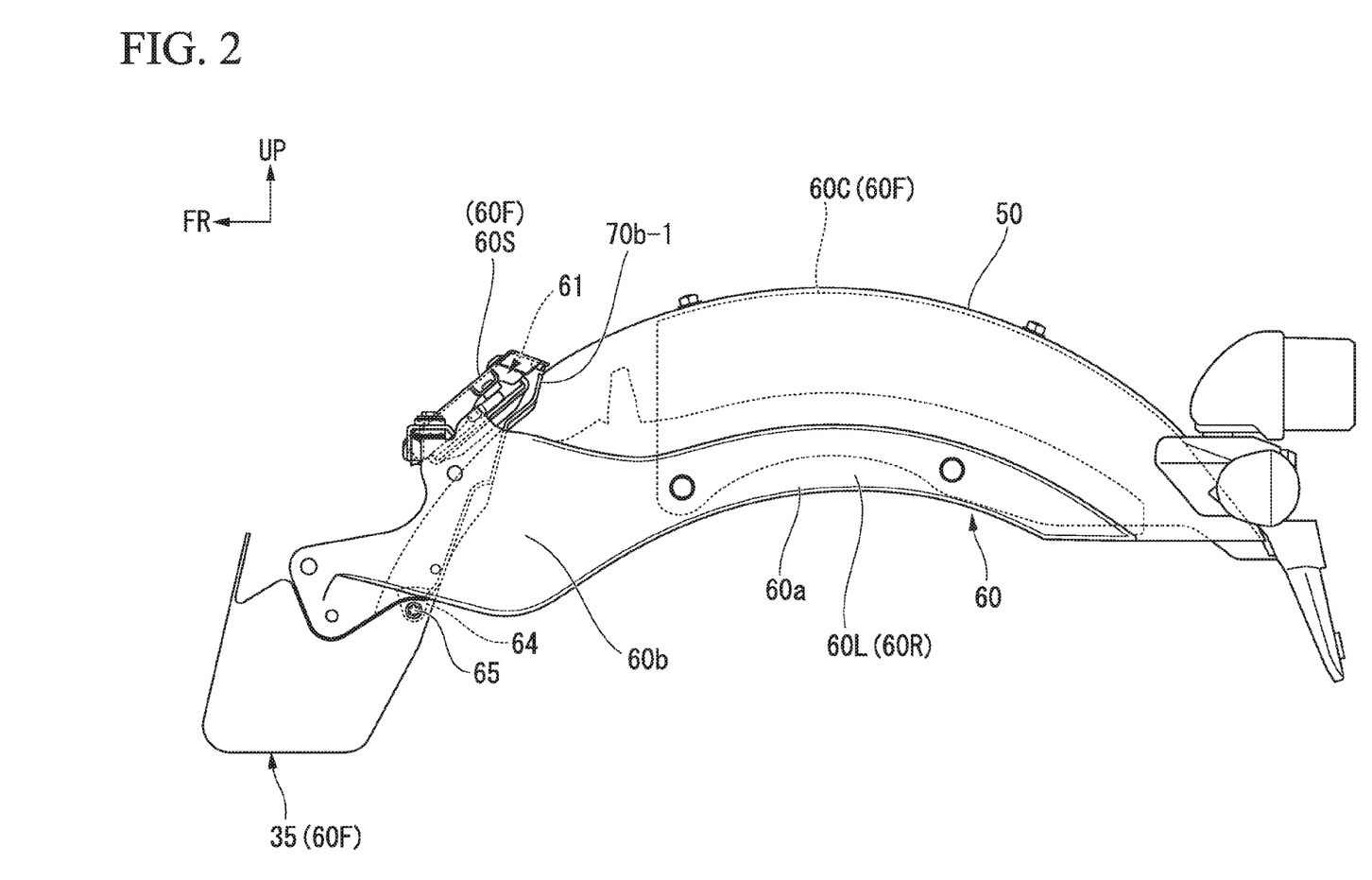
FIG. 2 is a side view showing a portion of the saddle riding vehicle according to the embodiment of the present invention.

FIG. 2 is a view showing the rear fender frame 60 and the rear fender 50 when seen from a left side.

The rear fender frame 60 has a pair of side frame sections 60L and 60R disposed at both of the left and right sides in the vehicle width direction, and a cross frame section 60F configured to connect the pair of side frame sections 60L and 60R at upper sides thereof. The cross frame section 60F has a center plate 60C, a seat support plate 60S and an auxiliary machine case 35. In the case of the embodiment, the side frame sections 60L and 60R, the center plate 60C, the seat support plate 60S and the auxiliary machine case 35 are formed of a metal such as an aluminum alloy or the like.

Each of the left and right side frame sections 60L and 60R has an arc region 60a having an arc shape substantially along an upper section shape of the rear wheel Wr when seen in a side view, and a front region 60b extending forward from a front section of the arc region 60a and fastened and fixed to the rear frame 16 side. The seat support plate 60S extending in the vehicle width direction is connected to an upper section of an area of the front region 60b close to the arc region 60a.

Further, a regulator 61 (regulator/rectifier) serving as an electrical component configured to convert alternating current power generated by a generator (not shown) into direct current and output a voltage to a specified voltage or less is fastened and fixed to a lower surface of an upper wall section of the seat support plate 60S.

In addition, left and right side edge portions of the center plate 60C having a substantially U-shaped cross section are fastened and fixed to the arc regions 60a of the left and right side frame sections 60L and 60R. The center plate 60C is abutted against side surfaces in the vehicle width direction of the arc regions 60a of the side frame sections 60L and 60R such that opening sides of the U-shaped cross section are directed downward, and in this state, fastened and fixed to the arc regions 60a.

The rear fender 50 overlaps an upper surface of the center plate 60C and outer side surfaces of the arc regions 60a of the left and right side frame sections 60L and 60R from above, and in this state, the rear fender 50 is fastened and fixed thereto.

The auxiliary machine case 35 has left and right upper edge portions disposed between the front regions 60b of the corresponding left and right side frame sections 60L and 60R. Fastening flanges 64 protruding downward from positions deviated inward in the vehicle width direction protrude from the front regions 60b of the left and right side frame sections 60L and 60R. The fastening flanges 64 of the corresponding side frame sections 60L and 60R abut upper edge portions of left and right sidewalls of the auxiliary machine case 35 from the inside in the vehicle width direction. In this state, upper edge portions of the left and right sidewalls of the auxiliary machine case 35 are fastened and fixed to the fastening flanges 64 of the corresponding side frame sections 60L and 60R by bolts 65.

The auxiliary machine case 35 is formed in a substantially rectangular parallelepiped box shape, and disposed to bulge downward from the rear frame 16 in a region between the rear curved sections 14a of the main frames 14 and the rear wheel Wr. A reservoir tank 36 configured to store a hydraulic fluid used in a brake apparatus of the rear wheel Wr side is attached to a lower edge of a right side portion of the auxiliary machine case 35.

Figure 3:
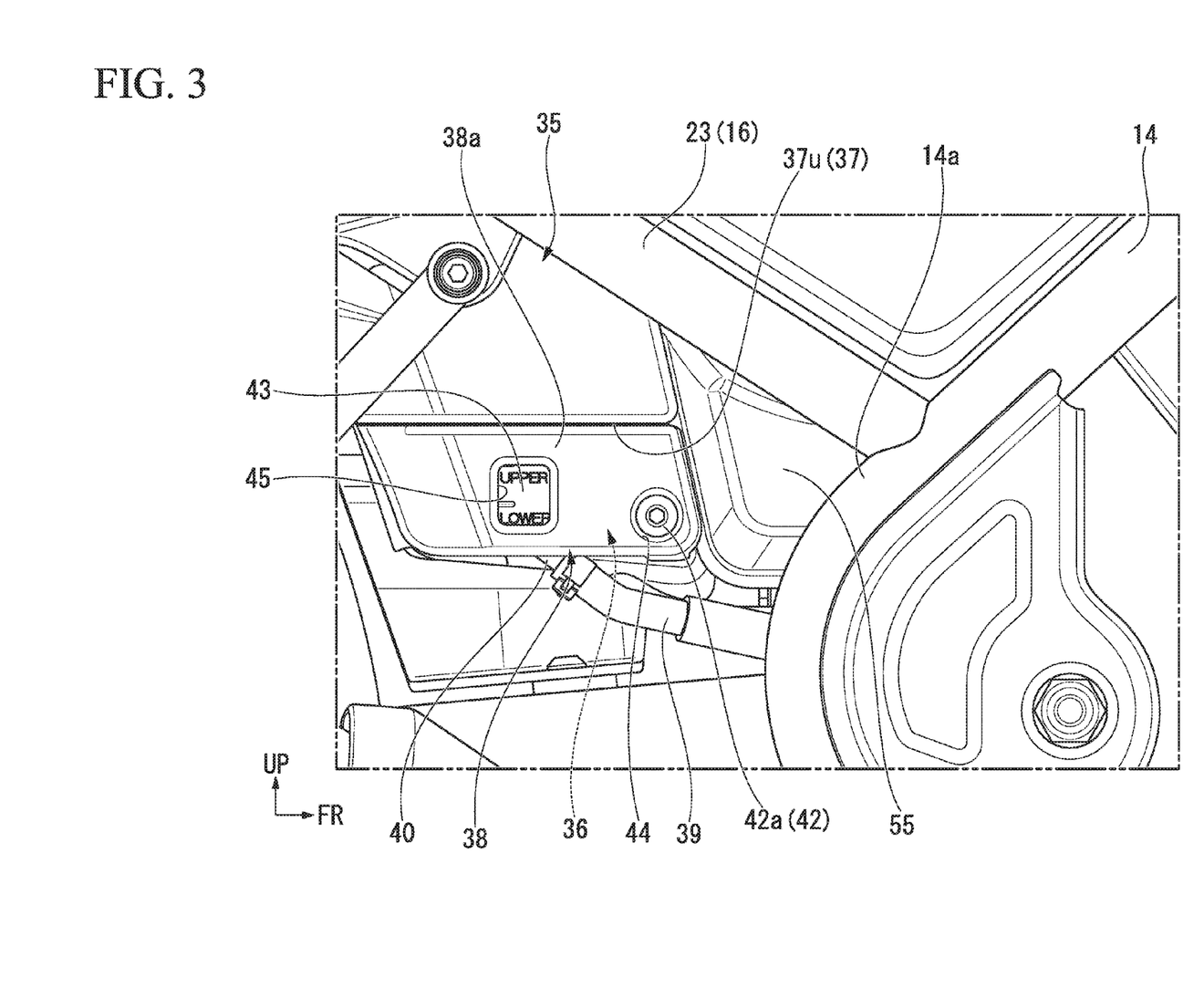
FIG. 3 is an enlarged side view of a portion of the saddle riding vehicle according to the embodiment of the present invention.
Figure 4:
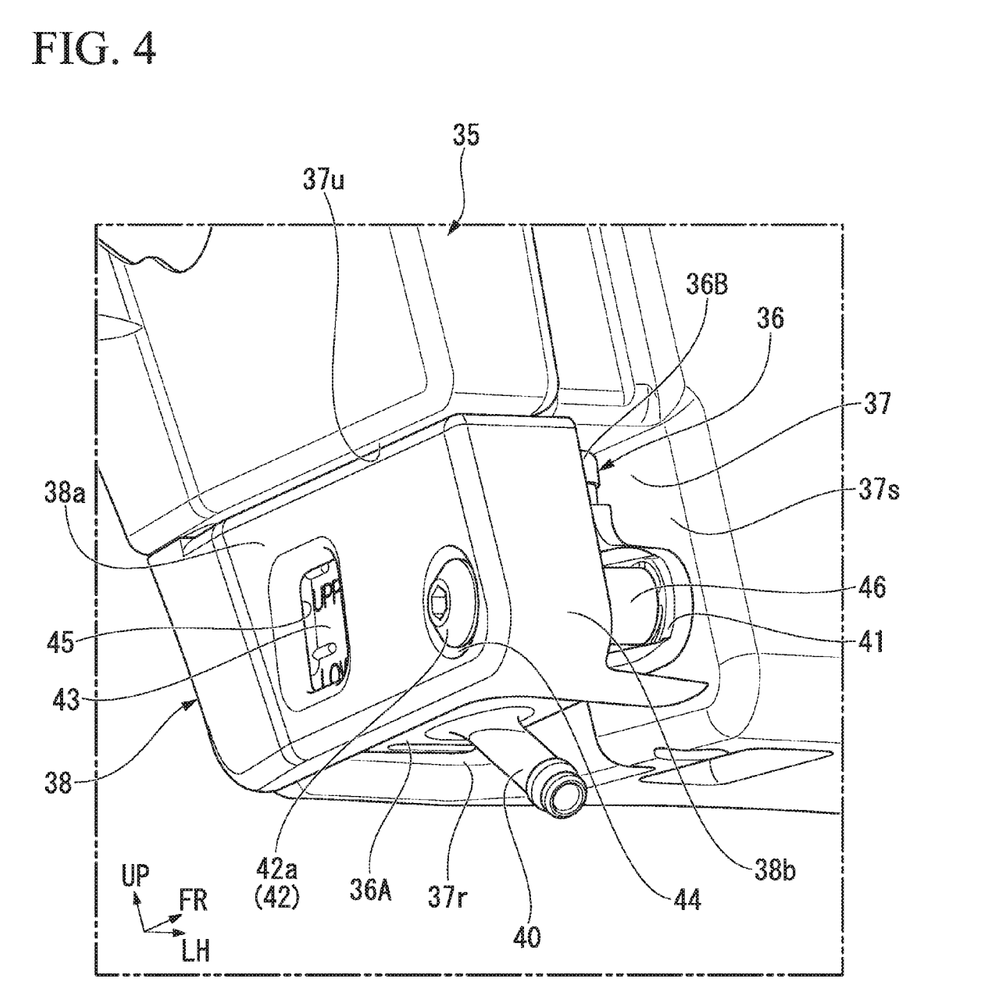
FIG. 4 is a perspective view showing a reservoir tank mounting section according to the embodiment of the present invention.

FIG. 3 is an enlarged view showing a mounting section of the reservoir tank 36 of FIG. 1, and FIG. 4 is a view showing the mounting section of the reservoir tank 36 when seen from a lower right front section of the vehicle.

A recessed section 37 recessed in a substantially square shape inside in the vehicle width direction is formed in the lower edge of the right side portion of the auxiliary machine case 35. The recessed section 37 has an upper wall 37u facing a lower side of the vehicle body, a rear wall 37r facing a front side of the vehicle body, and an inner wall 37s facing a right side of the vehicle body. The reservoir tank 36 is attached in the recessed section 37. The upper wall 37u of the recessed section 37 is formed in a planar shape substantially along an upper surface shape of the reservoir tank 36 (an upper surface shape of a lid member 36B, which will be described below). A lower surface of the upper wall 37u is disposed to oppose an upper surface of the reservoir tank 36 with a small gap therebetween or in a contact state while the reservoir tank 36 is attached in the recessed section 37.

In the embodiment, the upper wall 37u of the recessed section 37 constitutes an outer surface covering wall configured to cover an outer surface of the reservoir tank 36.

In addition, a right side of the recessed section 37 is covered by a tank cover 38. As described below, the tank cover 38 is fastened and fixed to the inner wall 37s of the auxiliary machine case 35 together with the reservoir tank 36.

In the embodiment, the recessed section 37 constitutes a tank supporting section configured to support the reservoir tank 36 in the auxiliary machine case 35. An air cleaner 55 (see FIG. 3) for intake filtration of the engine 30 is disposed in front of the recessed section 37 (a tank supporting section) of the auxiliary machine case 35.

Figure 5:
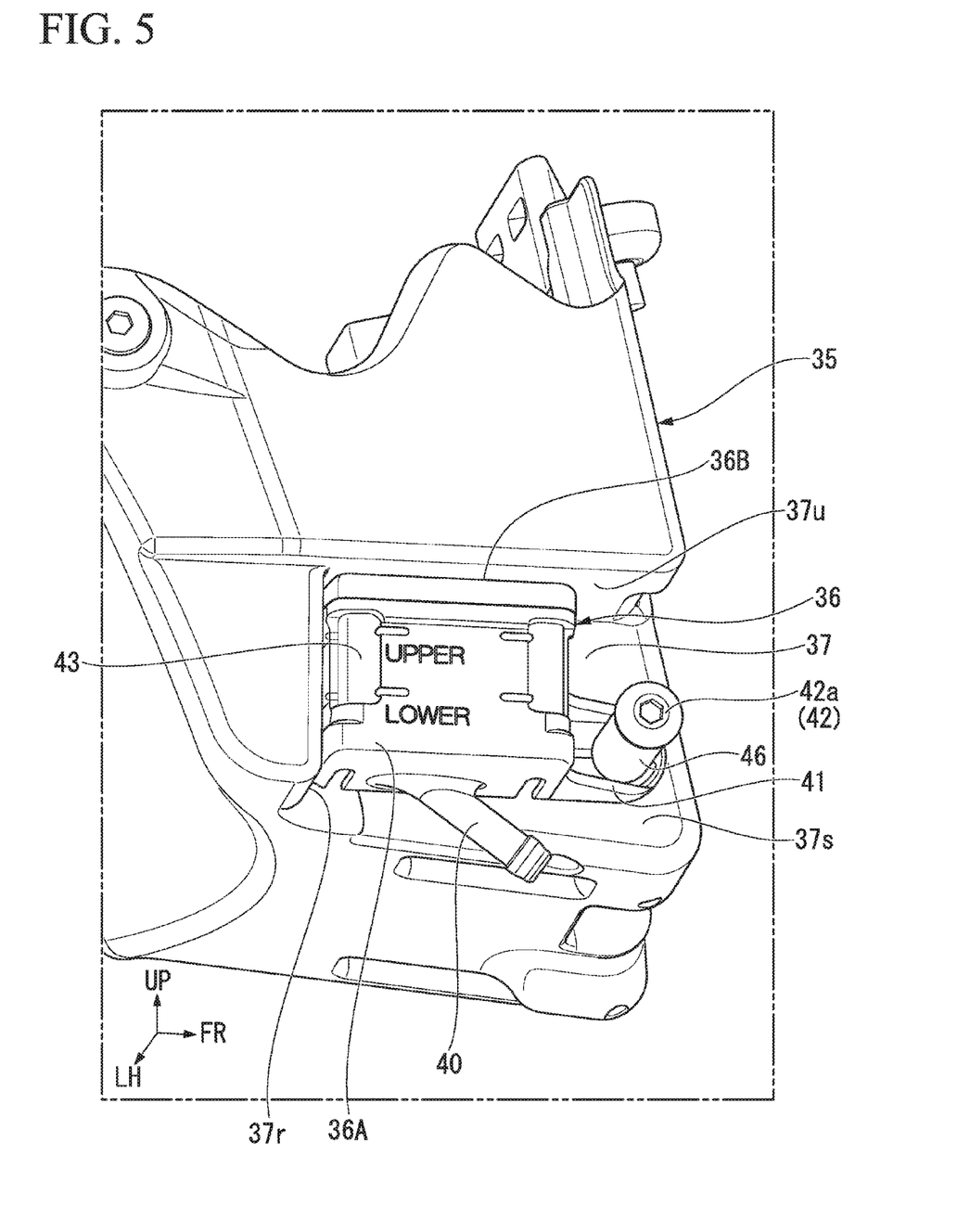
FIG. 5 is a perspective view of the reservoir tank mounting section according to the embodiment of the present invention, in which a tank cover is removed.
Figure 6:
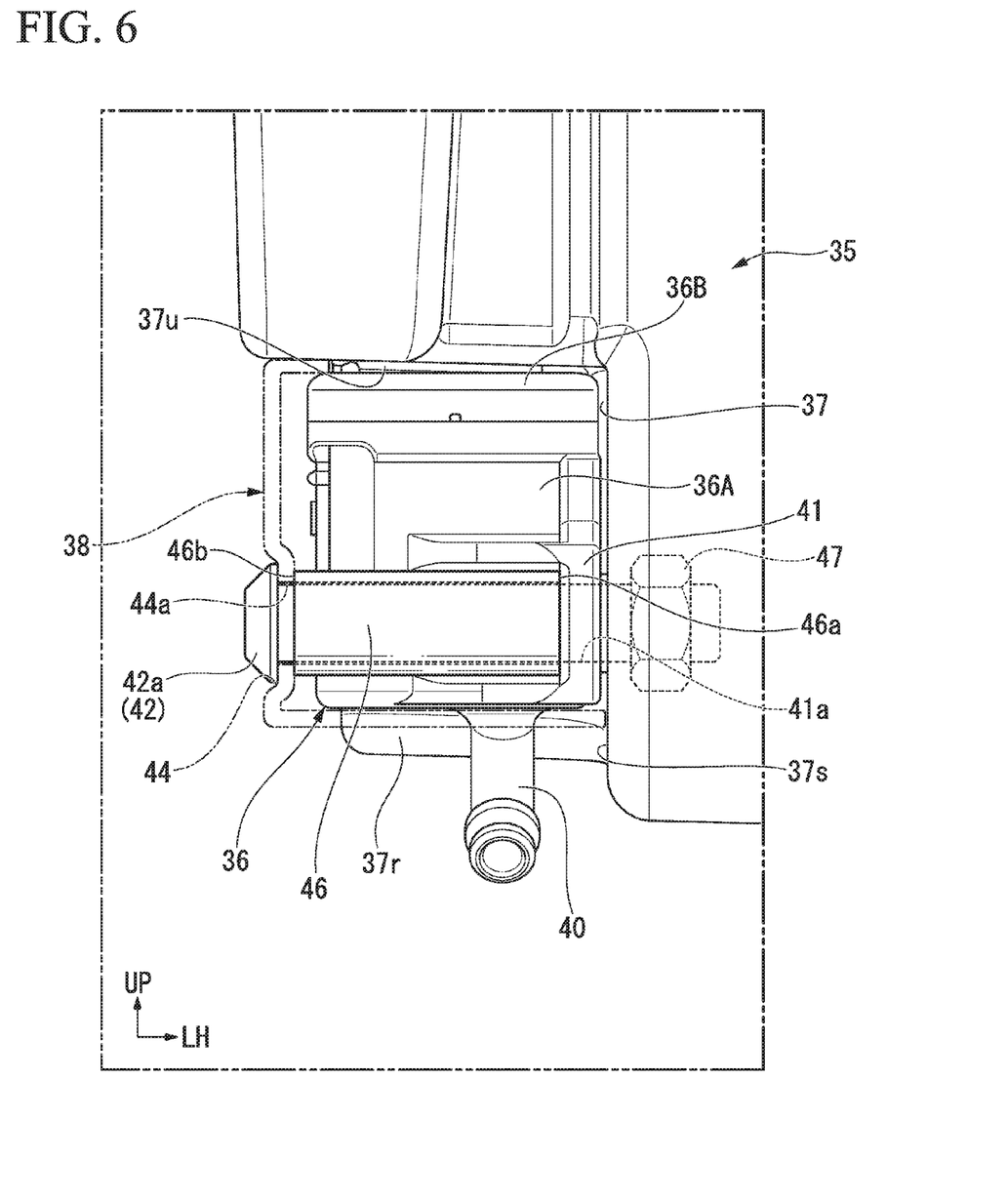
FIG. 6 is a front view of the reservoir tank mounting section according to the embodiment of the present invention.
Figure 7:
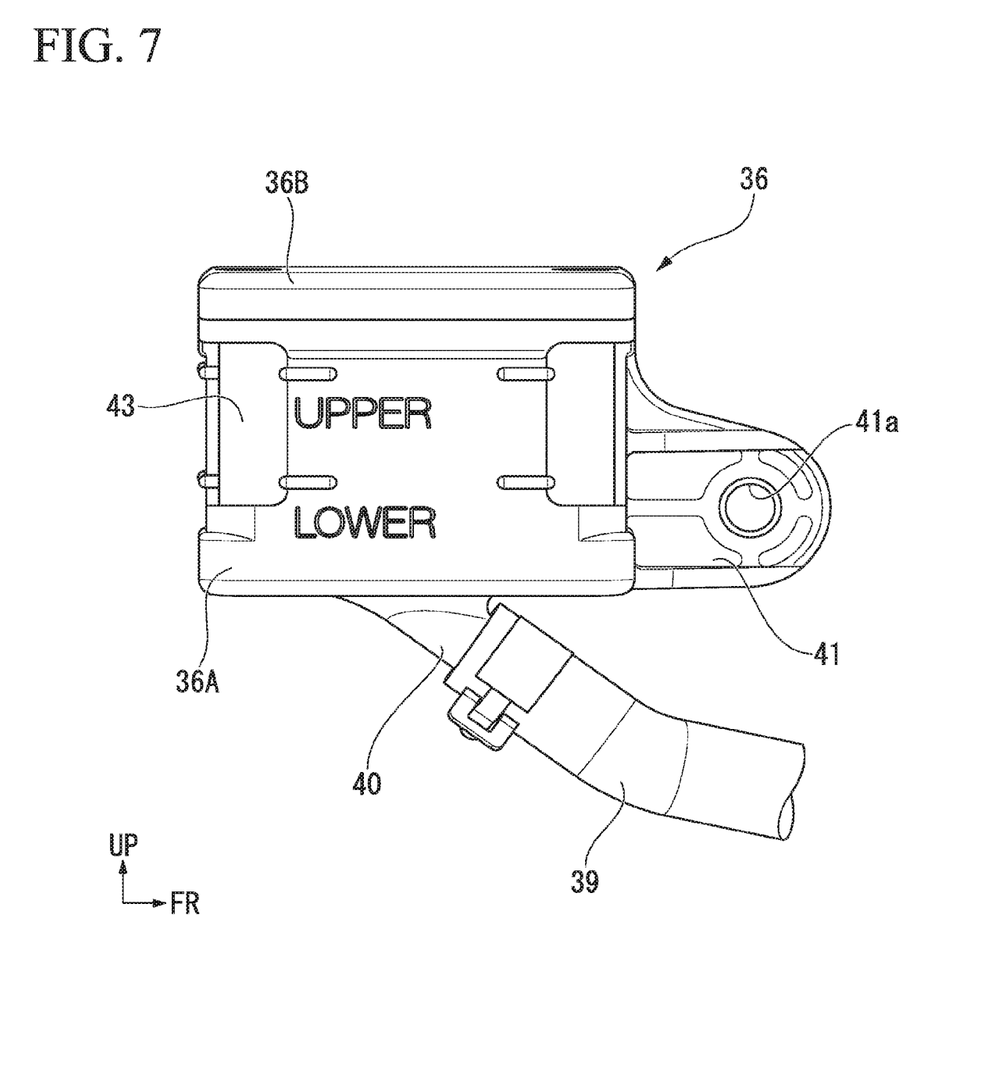
FIG. 7 is a front view of a reservoir tank according to the embodiment of the present invention.

FIG. 5 is a view showing the mounting section of the reservoir tank 36, in which the tank cover 38 is removed from the auxiliary machine case 35, when seen from a lower side of a right front section of the vehicle, and FIG. 6 is a view showing the mounting section of the reservoir tank 36, in which the tank cover 38 is removed from the auxiliary machine case 35, when seen from a front side of the vehicle. In addition, FIG. 7 is a view showing the reservoir tank 36 when seen from the outside in the vehicle width direction.

The reservoir tank 36 includes a tank main body 36A having a volume smaller than that of the recessed section 37 and formed in a substantially square box shape, and the lid member 36B attached to an upper section of the tank main body 36A. A pipeline connecting port 40 connected to a brake pipeline 39 (see FIG. 3 and FIG. 7) protrudes from a lower surface of the tank main body 36A, and a hydraulic fluid of the brake apparatus is stored in the tank main body 36A. The hydraulic fluid in the tank main body 36A is replenished by removing the lid member 36B from the upper section of the tank main body 36A.

A fastening flange 41 (a fastening section) protruding from a position deviated inward in the vehicle width direction toward the front side of the vehicle body extends from the front section of the tank main body 36A. A bolt insertion hole 41a into which a bolt 42 serving as a fastening member is inserted is formed in the fastening flange 41. The fastening flange 41 abuts the inner wall 37s together with the tank main body 36A when the reservoir tank 36 is fastened and fixed into the recessed section 37.

A positioning pin (not shown) configured to position the reservoir tank 36 on the auxiliary machine case 35 protrudes from a surface directed inward in the vehicle width direction of the tank main body 36A. The positioning pin is inserted into a positioning hole (not shown) formed in the inner wall 37s of the recessed section 37 of the auxiliary machine case 35.

In addition, a residual quantity display part 43 configured to display a residual quantity of the hydraulic fluid in the reservoir tank 36 is installed at a surface directed outward in the vehicle width direction of the tank main body 36A. The residual quantity display part 43 may be formed of, for example, a transparent or semi-transparent material through which the liquid surface of the hydraulic fluid in the reservoir tank 36 can be seen, and configured of a scale graduated on a viewing surface, or the like.

The tank cover 38 includes an outer sidewall 38a configured to cover an outer side in the vehicle width direction of the recessed section 37 of the auxiliary machine case 35 and a front wall 38b configured to cover a side of the recessed section 37 in a forward direction of the vehicle body, and a rear edge portion of the outer sidewall 38a overlaps an outer side surface of the auxiliary machine case 35 in the vehicle width direction. In addition, a concave portion 44 recessed in a circular shape inside in the vehicle width direction is formed in a lower region of a front edge portion of the outer sidewall 38a, and the concave portion 44 is made as a fastening section of the tank cover 38. As shown in FIG. 6, a bolt insertion hole 44a is formed in the concave portion 44. A head portion 42a of the bolt 42 comes into contact with the inside of the concave portion 44 from the outside in the vehicle width direction.

In addition, a substantially rectangular opening 45 configured to expose the residual quantity display part 43 of the reservoir tank 36 to the outside is formed in the outer sidewall 38a of the tank cover 38.

A tubular collar 46 is interposed between the fastening flange 41 of the reservoir tank 36 and the concave portion 44 of the tank cover 38. A shaft section of the bolt 42 passing through the bolt insertion holes 44a and 41a of the tank cover 38 and the reservoir tank 36 is inserted into the collar 46. As shown in FIG. 6, a fixing nut 47 installed at the auxiliary machine case 35 is screwed onto a distal end portion of the shaft section of the bolt 42.

In the embodiment, the bolt 42 and the collar 46 constitute a fastening member configured to detachably attach the tank cover 38 and the reservoir tank 36 to the auxiliary machine case 35.

When the reservoir tank 36 is actually mounted at the recessed section 37 of the auxiliary machine case 35, the positioning pin of the reservoir tank 36 is inserted into the positioning hole in the recessed section 37 on the auxiliary machine case 35 side, the reservoir tank 36 is disposed to abut the inner wall 37s of the recessed section 37, the collar 46 is disposed between the fastening flange 41 of the reservoir tank 36 and the concave portion 44 of the tank cover 38 in this state, and the tank cover 38 overlaps the reservoir tank 36 and the side surface of the auxiliary machine case 35. Next, in this state, the shaft section of the bolt 42 is inserted into the bolt insertion hole 41a of the tank cover 38, a shaft hole of the collar 46 and the bolt insertion hole 44a of the reservoir tank 36 to be fastened to the fixing nut 47 on the auxiliary machine case 35 side. Accordingly, the reservoir tank 36 is sandwiched between one end surface 46a of the collar 46 and the inner wall 37s of the auxiliary machine case 35 to be fixed to the auxiliary machine case 35, and the tank cover 38 is sandwiched between the head portion 42a of the bolt 42 and the other end portion of the collar 46 to be fixed to the auxiliary machine case 35.

Figure 8:
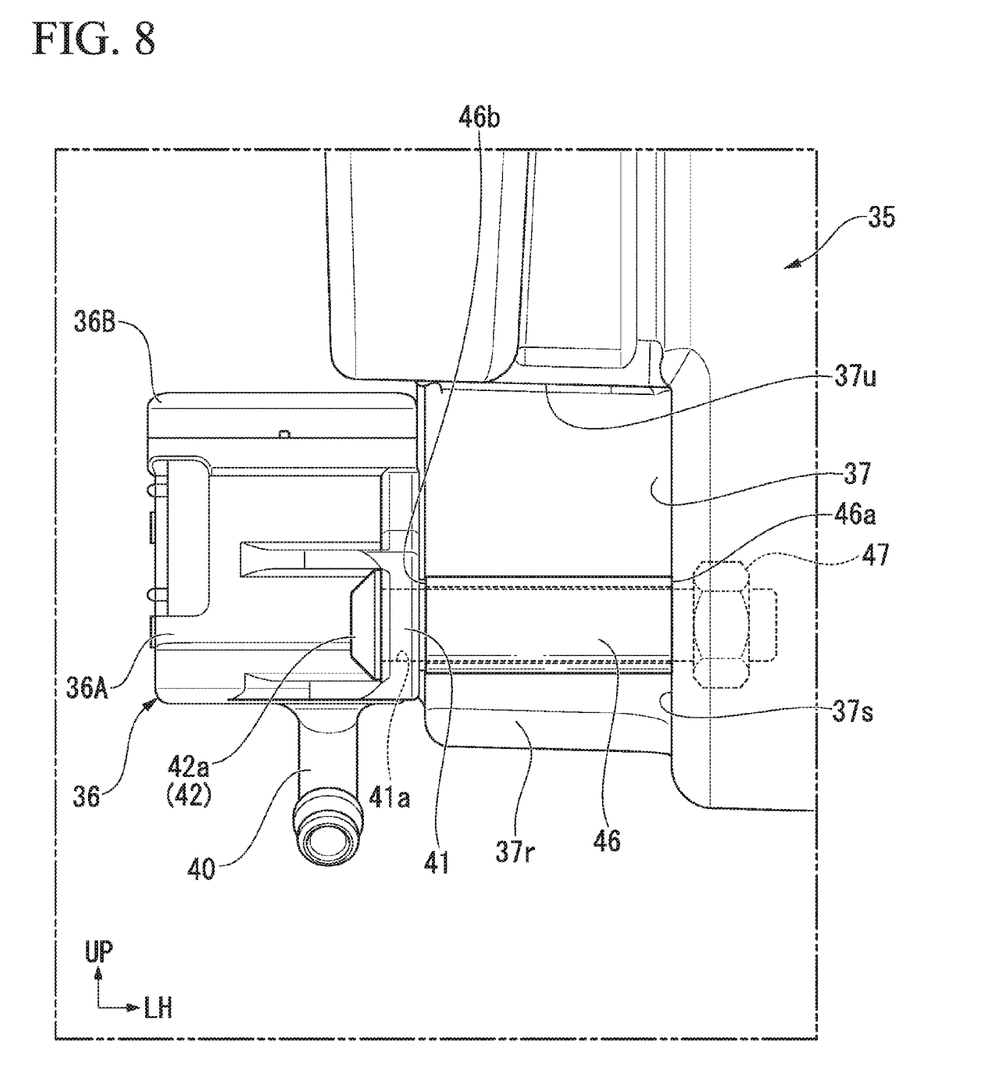
FIG. 8 is a front view of the reservoir tank mounting section according to the embodiment of the present invention.

In addition, as shown in FIG. 8, the bolt 42 and the collar 46 can be temporarily held by the auxiliary machine case 35 in a state in which the reservoir tank 36 partially protrudes from the inside of the recessed section 37 upon maintenance such as hydraulic fluid replenishment or the like of the reservoir tank 36. In this case, in a state in which once the bolt 42 is released from the auxiliary machine case 35 and the tank cover 38 is removed, the fastening flange 41 of the reservoir tank 36 is sandwiched between the head portion 42a of the bolt 42 and the other end surface 46b of the collar 46, and in this state, the distal end portion of the bolt 42 is fastened to the fixing nut 47. In this state, the reservoir tank 36 is configured such that portions of the upper surface and the side surface overlap the upper wall 37u and the rear wall 37r (a circumferential wall) of the recessed section 37 in the vehicle width direction.

Further, in this state, the reservoir tank 36 may be set such that a portion of any one of the upper surface and the side surface overlaps the upper wall 37u of the recessed section 37 or the rear wall 37r (the circumferential wall) in the vehicle width direction.

As described above, in the reservoir tank mounting structure according to the embodiment, since the recessed section 37 serving as the tank supporting section is formed in the auxiliary machine case 35 and the upper wall 37u, which is planar, substantially conforming to the upper surface shape of the reservoir tank 36 is formed in the recessed section 37, it is possible to prevent a large gap from being formed on the upper surface side of the reservoir tank 36 using the auxiliary machine case 35. Accordingly, when this reservoir tank mounting structure is employed, it is possible to prevent deposits such as dust, mud, or the like, from being collected on the upper surface of the reservoir tank 36 while suppressing an increase in the number of parts.

In addition, in the reservoir tank mounting structure according to the embodiment, the tank supporting section configured to hold the reservoir tank 36 is constituted by the recessed section 37 in which the side surface of the auxiliary machine case 35 is formed to be recessed inward in the vehicle width direction. For this reason, an outward bulging amount in the vehicle width direction of the reservoir tank 36 can be suppressed.

Further, in the case of the reservoir tank mounting structure according to the embodiment, the residual quantity display part 43 configured to display a residual quantity of the hydraulic fluid in the reservoir tank 36 is installed at the surface directed outward in the vehicle width direction in a state in which the reservoir tank 36 is disposed in the recessed section 37 of the auxiliary machine case 35. For this reason, upon maintenance working, the residual quantity of the hydraulic fluid in the reservoir tank 36 can be easily checked through the residual quantity display part 43.

In addition, in the reservoir tank mounting structure according to the embodiment, since the surface outside in the vehicle width direction of the reservoir tank 36 is covered by the tank cover 38, foreign substances such as scattered materials or the like upon traveling of the vehicle can be prevented from contacting the reservoir tank 36. Further, in the reservoir tank mounting structure, since the opening 45 configured to expose the residual quantity display part 43 of the reservoir tank 36 to the outside is formed in the outer sidewall 38a of the tank cover 38, the residual quantity display part 43 can be reliably and visually checked from the outside of the tank cover 38 through the opening 45.

Accordingly, when this reservoir tank mounting structure is employed, the reservoir tank 36 can be reliably protected from scattered materials or the like without sacrificing maintenance performance.

In addition, in the reservoir tank mounting structure according to the embodiment, since the reservoir tank 36 and the tank cover 38 can be detachably attached to the auxiliary machine case 35 using the common bolt 42 and collar 46, an increase in the number of parts can be suppressed while the performance of protecting the reservoir tank 36 by the tank cover 38 is improved.

In addition, in the reservoir tank mounting structure according to the embodiment, the reservoir tank 36 and the tank cover 38 are fastened and fixed to the auxiliary machine case 35 by the bolt 42 in a state in which the collar 46 is interposed between both of the fastening sections (between the fastening flange 41 and the concave portion 44 of the outer sidewall 38a), the fastening flange 41 of the reservoir tank 36 is sandwiched between the head portion 42a of the bolt 42 and the other end portion of the collar 46 upon maintenance of the reservoir tank 36, and in this state, the reservoir tank 36 can be fastened and fixed to the auxiliary machine case 35 together with the collar 46.

For this reason, upon maintenance of the reservoir tank 36, the reservoir tank 36 is temporarily held while protruding toward a side portion of the auxiliary machine case 35, and in this state, maintenance work on the reservoir tank 36 can be performed. Accordingly, when this reservoir tank mounting structure is employed, maintenance workability can be improved.

Further, in the reservoir tank mounting structure according to the embodiment, when the reservoir tank 36 is temporarily held by the auxiliary machine case 35, portions of the upper surface and the sidewall of the reservoir tank 36 are set to overlap the upper wall 37u and the rear wall 37r of the auxiliary machine case 35 in the vehicle width direction. For this reason, as the upper surface or the side surface of the reservoir tank 36 abuts the upper wall 37u or the rear wall 37r of the auxiliary machine case 35, it is possible to restrict positional deviation or large inclination of the reservoir tank 36 in a temporary holding state. Accordingly, when this configuration of the reservoir tank mounting section is employed, maintenance workability can be further improved.

In addition, in the reservoir tank mounting structure according to the embodiment, since a portion of the auxiliary machine case 35 constitutes the cross frame section 60F configured to connect the left and right side frame sections 60L and 60R of the rear fender frame 60, stiffness of the rear fender frame 60 can be efficiently increased without causing an increase in the number of parts of the vehicle body.

Further, in the reservoir tank mounting structure according to the embodiment, since the outer surface of the air cleaner 55 is disposed in the vicinity of an opposite position of a front side of the recessed section 37 (the tank supporting section), a front surface side of the reservoir tank 36 can be protected using the outer surface of the air cleaner 55.

Further, the present invention is not limited to the above-mentioned embodiment but various design changes may be made without departing from the scope of the present invention.

In addition, the saddle riding vehicle according to the present invention is not limited to the motorcycle (including a motorized bicycle and a scooter type vehicle) and a three-wheeled small vehicle (also including a two-front-wheeled and one-rear-wheeled vehicle, in addition to a one-front-wheeled and two-rear-wheeled vehicle) or a four-wheeled small vehicle may also be included.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A reservoir tank mounting structure of a saddle riding vehicle comprising:
   a reservoir tank configured to store a hydraulic fluid of a brake apparatus; and
   an auxiliary machine case,
   wherein the auxiliary machine case has a tank supporting section at which the reservoir tank is supported,
   the tank supporting section is formed at a recessed section that is formed by having an outer surface of the auxiliary machine case recessed inward,
   the tank supporting section includes an outer surface covering wall that is configured to cover an outer surface of the reservoir tank with a shape substantially conforming to the outer surface shape of the reservoir tank, the tank supporting section is formed at the recessed section in which a side surface of the auxiliary machine case is recessed inward in a vehicle width direction, a residual quantity display part of a hydraulic fluid is installed at an outer surface of the reservoir tank in the vehicle width direction, and the reservoir tank is disposed in the recessed section in a state in which the residual quantity display part is exposed.

2. The reservoir tank mounting structure of the saddle riding vehicle according to claim 1, further comprising;

a tank cover configured to cover at least an outer surface of the reservoir tank in the vehicle width direction, wherein the tank cover has an opening for exposing the residual quantity display part of the reservoir tank to the outside.

3. The reservoir tank mounting structure of the saddle riding vehicle according to claim 1, further comprising:

the tank cover configured to cover an outer surface of the reservoir tank in a state in which the reservoir tank is accommodated in the recessed section, wherein the tank cover is detachably attached to the auxiliary machine case by fastening members together with the reservoir tank.

4. The reservoir tank mounting structure of the saddle riding vehicle according to claim 3, wherein a fastening section of the reservoir tank with respect to the auxiliary machine case is provided at a position separated inward in the vehicle width direction with respect to a fastening section of the tank cover, and the fastening member comprises a collar interposed between the fastening section of the tank cover and the fastening section of the reservoir tank, and a bolt that passes through the fastening section of the tank cover, the collar and the fastening section of the reservoir tank and that is fastened to the auxiliary machine case.

5. The reservoir tank mounting structure of the saddle riding vehicle according to claim 4, wherein, in a state in which the fastening section is fixed to the auxiliary machine case while the tank cover is removed and the fastening section of the reservoir tank is sandwiched between a head portion of the bolt and the collar, the outer surface of the reservoir tank is formed to overlap at least one of the outer surface covering wall and a circumferential wall of the recessed section in the vehicle width direction.

6. The reservoir tank mounting structure of the saddle riding vehicle according to claim 1, wherein a portion of the auxiliary machine case forms a cross frame section configured to connect left and right side frame sections of a rear fender frame, and an outer surface of an air cleaner is disposed to oppose the outside of the tank supporting section of the auxiliary machine case.

* * * * *